US012562367B2

(12) United States Patent
Pan et al.

(10) Patent No.: US 12,562,367 B2
(45) Date of Patent: Feb. 24, 2026

(54) DIRECT RECYCLING METHOD FOR LITHIUM-ION BATTERIES

(71) Applicants: NISSAN NORTH AMERICA, INC., Franklin, TN (US); Michigan Technological University, Houghton, MI (US)

(72) Inventors: Lei Pan, Houghton, MI (US); Tinuade O. Folayan, Houghton, MI (US); Kulwinder Dhindsa, Westland, MI (US); Dianne Atienza Hay, Hartland, MI (US)

(73) Assignees: NISSAN NORTH AMERICA, INC., Franklin, TN (US); Michigan Technological University, Houghton, MI (US)

( * ) Notice: Subject to any disclaimer, the term of this patent is extended or adjusted under 35 U.S.C. 154(b) by 614 days.

(21) Appl. No.: 18/101,057

(22) Filed: Jan. 24, 2023

(65) Prior Publication Data

US 2024/0250236 A1 Jul. 25, 2024

(51) Int. Cl.
H01M 4/1315 (2010.01)
H01M 4/04 (2006.01)
H01M 4/62 (2006.01)

(52) U.S. Cl.
CPC ....... H01M 4/1315 (2013.01); H01M 4/0404 (2013.01); H01M 4/623 (2013.01)

(58) Field of Classification Search
None
See application file for complete search history.

(56) References Cited

U.S. PATENT DOCUMENTS

| | | | | |
|---|---|---|---|---|
| 12,370,557 | B2 * | 7/2025 | Kochhar | C22B 7/007 |
| 2014/0318313 | A1 * | 10/2014 | Takahashi | C22B 4/00 |
| | | | | 75/10.53 |
| 2018/0013181 | A1 * | 1/2018 | Ho | H01M 6/52 |
| 2021/0359351 | A1 * | 11/2021 | Barkanic | H01M 10/54 |
| 2021/0384562 | A1 * | 12/2021 | Liu | H01M 4/5825 |
| 2022/0344735 | A1 * | 10/2022 | Ahn | C22B 23/02 |

(Continued)

OTHER PUBLICATIONS

Machine Translation of TW-2013-06358-A. (Year: 2013).*

(Continued)

*Primary Examiner* — Kevin M Bernatz
(74) *Attorney, Agent, or Firm* — Spencer Fane, LLP

(57) ABSTRACT

A method is provided for producing a cathode active material. The method includes shredding an anode sheet including an anode material disposed on an anode current collector with a cathode sheet including a cathode material disposed on a cathode current collector, rinsing the sheets with an organic solvent, agitating the sheets to delaminate the anode material from the anode current collector, separating the anode material from the anode current collector using a filter and/or a sieve, and blending the anode current collector and the cathode sheet to delaminate the cathode material from the cathode current collector. The method further includes performing size reduction and deagglomeration on the cathode material, which includes the cathode active material and a binder, separating the cathode material from the cathode current collector using a filter and/or a sieve, and performing gravity separation to separate the cathode active material from the binder.

20 Claims, 2 Drawing Sheets

(56) References Cited

U.S. PATENT DOCUMENTS

| | | | | |
|---|---|---|---|---|
| 2022/0344737 | A1* | 10/2022 | Belharouak | H01M 10/54 |
| 2023/0352755 | A1* | 11/2023 | Aragon | H01M 6/52 |
| 2024/0047775 | A1* | 2/2024 | Lipson | C22B 1/02 |
| 2024/0047776 | A1* | 2/2024 | Goda | H01M 10/54 |
| 2024/0088465 | A1* | 3/2024 | Moazzen | H01M 4/623 |
| 2024/0297356 | A1* | 9/2024 | Hsu | C22B 7/007 |
| 2024/0392409 | A1* | 11/2024 | Klaehn | C22B 7/007 |
| 2024/0399430 | A1* | 12/2024 | Ding | B09B 3/80 |
| 2025/0070294 | A1* | 2/2025 | Katal | C22B 3/44 |
| 2025/0096344 | A1* | 3/2025 | Biederman | C22B 21/0023 |

OTHER PUBLICATIONS

Ruiting Zhan et al.; "Recovery of active cathode materials from lithium-ion batteries using froth flotation"; Sustainable Materials and Technologies; c. 2018; pp. 1-9.

Hosop Shin et al.; "Electrochemical Performance of Recycled Cathode Active Materials Using Froth Flotation-based Separation Process"; J. Electrochem. Soc.; c. 2020; vol. 167 (20504).

Ruiting Zhan et al.; "A cycling-insensitive recycling method for producing lithium transition metal oxide from Li-ion batteries using centrifugal gravity separation"; Sustainable Materials and Technologies; c. 2021; pp. 1-10.

Ruiting Zhan et al.; "De-agglomeration of cathode composites for direct recycling of Li-ion batteries"; Waste Management; c. 2020; vol. 105; pp. 39-48.

\* cited by examiner

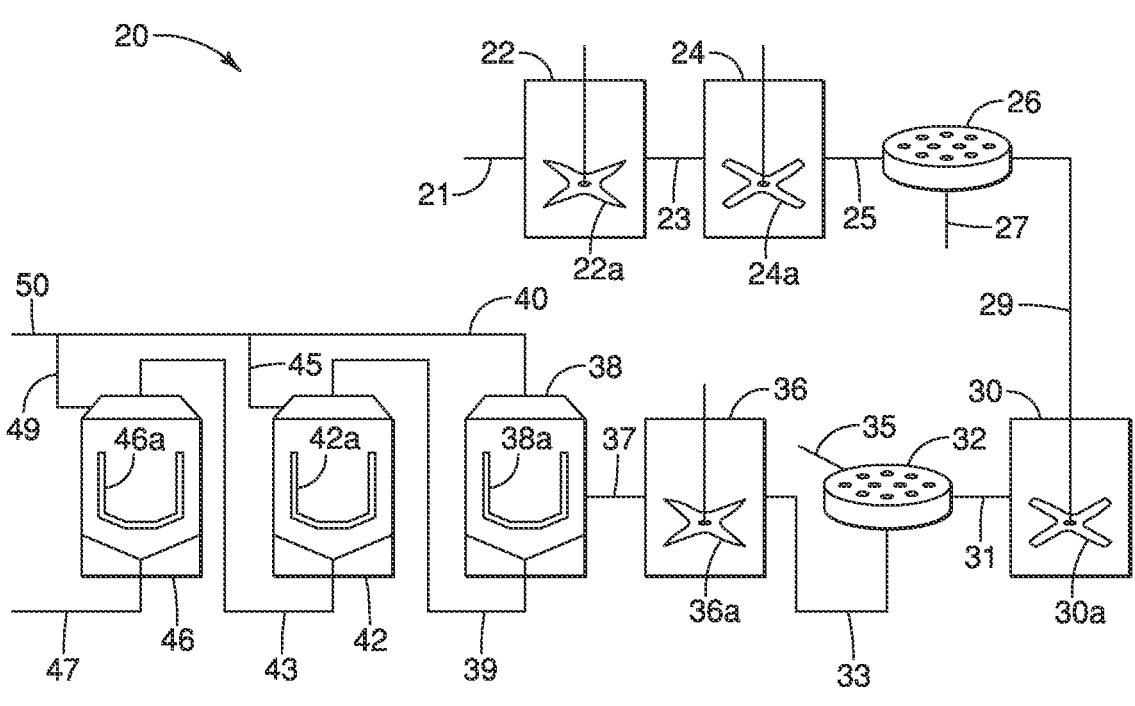

Mix cathode material with water — 62

Feed cathode material and water mixture to rougher — 64

Separate binder and water from first cathode active material stream in the rougher — 66

Add water to the first cathode active material stream and separate binder and water from second cathode active material stream in a first cleaner — 68

Add water to the second cathode active material stream and separate binder and water from cathode active material stream in a second cleaner — 70

FIG. 3

DIRECT RECYCLING METHOD FOR LITHIUM-ION BATTERIES

BACKGROUND

Field of the Invention

The present invention generally relates to a direct recycling method for cathode active material in a lithium-ion battery by agitation at different speeds to delaminate the electrode materials from the current collectors and gravity separation to separate the cathode active material from a binder. The method includes shredding an anode sheet with a cathode sheet and rinsing the sheets with an organic solvent. The anode sheet includes an anode material disposed on an anode current collector, and the cathode sheet includes an anode material disposed on an anode current collector. The method further includes agitating the anode sheet and the cathode sheet at a first speed to delaminate the anode material from the anode current collector and separating the anode material from the anode current collector using a first filter and/or a first sieve. The method also includes blending the anode current collector and the cathode sheet at a second speed to delaminate the cathode material from the cathode current collector, performing size reduction and deagglomeration on the cathode material, and separating the cathode material from the cathode current collector using a second filter and/or a second sieve. The cathode material includes the cathode active material and a binder. The method further includes performing gravity separation on the cathode material to separate the cathode active material from the binder.

Background Information

Lithium-based batteries that include lithium metal anodes or lithium-based cathode material are desirable because they have a high energy density and, thus, can generate a large amount of power with a relatively thin electrode structure, thus permitting a reduction in the size of the battery as compared with other conventional batteries including anodes made of carbon or silicon.

Cathode active materials are one of the most expensive components in lithium-ion batteries. In particular, cobalt is very expensive, and there is a limited supply of other metals typically used in cathode active materials for lithium-ion batteries, such as lithium nickel manganese cobalt oxide ($LiNiMnCoO_2$, also commonly referred to as "NMC"). Therefore, it is desirable to recycle cathode active materials once the batteries have been used by removing the electrode materials from the current collectors and separating the cathode active material from a binder to obtain clean cathode active material for use in a new battery.

Conventional recycling methods involve separating the cathode active material from the binder using a large amount of solvent, then replenishing the lithium lost during battery cycling after the cathode active material is recovered. However, conventional solvents used to separate cathode active material and binder are both expensive and bad for the environment. Furthermore, conventional recycling methods cannot sufficiently separate the cathode active material particles from the binder to achieve a high purity cathode active material. Therefore, these recycling methods do not achieve a high yield of active material sufficient to justify their high cost and negative environmental effects.

Alternative methods for recycling the cathode active material also have several drawbacks. For example, one conventional recycling method involves burning or melting the entire lithium-ion battery at a high temperature. However, this method is expensive and results in a large loss of lithium which must then be replenished. Another conventional recycling method involves hydrothermal processing of the cathode using a leaching agent to leach out individual metal precursors for the cathode active material. However, once the individual metal precursors have been recovered, the cathode active material must be re-synthesized to manufacture a new cathode active material.

Therefore, further improvement is needed to sufficiently recover both the large and small cathode active material particles and to minimize the amount of solvent used in the recycling process. Furthermore, it is desirable to directly recycle the used cathode material such that additional synthesis or manufacturing of the cathode active material from the individual metal precursors is not required.

SUMMARY

It has been discovered that cathode active material particles such as NMC particles can be directly recovered, rather than recovered as individual metal elements that must be re-synthesized to form cathode active material, in a simple separation method by rinsing and agitating the cathode sheet of a lithium-ion battery to delaminate the cathode material from the cathode sheet and performing gravity separation on the cathode material to separate the cathode active material from the binder. Furthermore, it has been discovered that the anode material may be selectively delaminated from the anode sheet and recovered by also rinsing and agitating the anode sheet of the lithium-ion battery and using a sieve or a filter to separate the anode material from the anode current collector.

In particular, anode and cathode sheets may be shredded together and rinsed with an organic solvent such as isopropyl alcohol ("IPA"). The shredded and rinsed electrode sheets may then be agitated at a low speed to delaminate the anode material from the anode sheet. Using a filter and/or a sieve, the anode material may be separated from the anode current collector. The cathode sheet and the anode current collector may then be blended at a high speed to delaminate the cathode material from the cathode current collector. The fine cathode material may then be separated from the coarse cathode current collector using a sieve and a filter. Size reduction and deagglomeration is then performed on the cathode material. Gravity separation is then performed on the recovered cathode material with water to separate the cathode active material from the binder. By performing low speed agitation and then high speed blending, the anode and cathode materials may be selectively delaminated from their respective current collectors. Furthermore, by using water to perform gravity separation on the cathode material, a high purity cathode active material may be recovered without using a lot of harmful solvent.

It has also been discovered that high purity cathode active material may be obtained from a cathode material in a gravity separation method using water and a plurality of separation devices. In particular, cathode active material may be separated from a binder by mixing the cathode material containing the cathode active material and the binder with water and feeding the mixture to a first gravity separation device. The lighter top stream containing water and binder is then separated from a heavier bottoms stream containing the cathode active material. The heavier bottoms stream is then fed to a second gravity separation device and mixed with water, and another top stream containing water and binder is separated from a final bottoms stream containing the cathode active material. The top streams are combined to form a light tails stream with binder and water, and the final bottoms stream contains the high purity cathode active material. The gravity separation method can also include a third or even a fourth gravity separation device. By using water and a plurality of gravity separation devices, a high purity cathode active material can be obtained from a starting cathode material containing cathode active material and binder.

Therefore, it is desirable to provide a method for directly recycling the cathode active material of a used battery by agitation at different speeds to delaminate the electrode materials from the current collectors and gravity separation to separate the cathode active material from a binder.

In view of the state of the known technology, one aspect of the present disclosure is to provide a method of producing a high purity cathode active material with minimal use of solvents which is more environmentally friendly and cost-effective than conventional solvent-based methods. The method includes shredding an anode sheet with a cathode sheet and rinsing the sheets with an organic solvent. The anode sheet includes an anode material disposed on an anode current collector, and the cathode sheet includes an anode material disposed on an anode current collector. The method further includes agitating the anode sheet and the cathode sheet at a first speed to delaminate the anode material from the anode current collector and separating the anode material from the anode current collector using a first filter and/or a first sieve. The method also includes blending the anode current collector and the cathode sheet at a second speed to delaminate the cathode material from the cathode current collector, separating the cathode material from the cathode current collector using a second filter and/or a second sieve, and performing size reduction and deagglomeration on the cathode material. The cathode material includes the cathode active material and a binder. The method further includes performing gravity separation on the cathode material to separate the cathode active material from the binder using water.

By performing low-speed agitation of the anode and cathode sheets, the anode material can be selectively delaminated and separated from the anode current collector. In contrast, by performing high-speed blending of the cathode sheet, the cathode material may be selectively delaminated and separated from the cathode current collector. Furthermore, by performing gravity separation on the cathode material that was selectively delaminated from the cathode current collector, a high purity cathode active material may be obtained without the use of expensive solvents that are bad for the environment.

Another aspect of the present disclosure is to provide a method of separating a binder from a cathode active material. The method includes combining the binder, the cathode active material and water in a first vessel to form a first mixture and using gravity to separate the first mixture into a first top stream comprising the water and the binder and a first bottom stream comprising the cathode active material. The method further includes feeding the first bottom stream into a second vessel, adding water to the second vessel to form a second mixture, and using gravity to separate the second mixture into a second top stream comprising the water and the binder and a second bottom stream comprising the cathode active material.

A final aspect of the present disclosure is to provide a system for producing a cathode active material from a cathode sheet and an anode sheet of a used battery. The cathode sheet includes a cathode material disposed on a cathode current collector, and the anode sheet includes an anode material disposed on an anode current collector. The system includes a first vessel, at least one of a first filter and a first sieve each having a size of 1.7 mm or less, a second vessel, a third vessel, at least one of a second filter and a second sieve each having a size of 45 μm or less, and at least one gravity separation vessel. The first vessel is configured to agitate the cathode sheet and the anode sheet at a first speed to delaminate the anode material from the anode current collector. The second vessel is configured to blend the anode current collector and the cathode sheet at a second speed to delaminate the cathode material from the cathode current collector. The third vessel is configured to perform size reduction and deagglomeration on the cathode material using a blade. The cathode material includes the cathode active material and a binder, and the gravity separation vessel is configured to separate the cathode active material from the binder.

By using a plurality of gravity separation devices and water instead of solvent, the cathode active material may be sufficiently separated from the binder without the need for expensive and hazardous solvents.

BRIEF DESCRIPTION OF THE DRAWINGS

Referring now to the attached drawings which form a part of this original disclosure:

FIG. 2 is a schematic view of a system for producing a cathode active material according to a second embodiment; and FIG. 3 is an illustrated flow chart showing a process of producing a cathode active material according to a third embodiment.

DETAILED DESCRIPTION OF EMBODIMENTS

Figure 1:
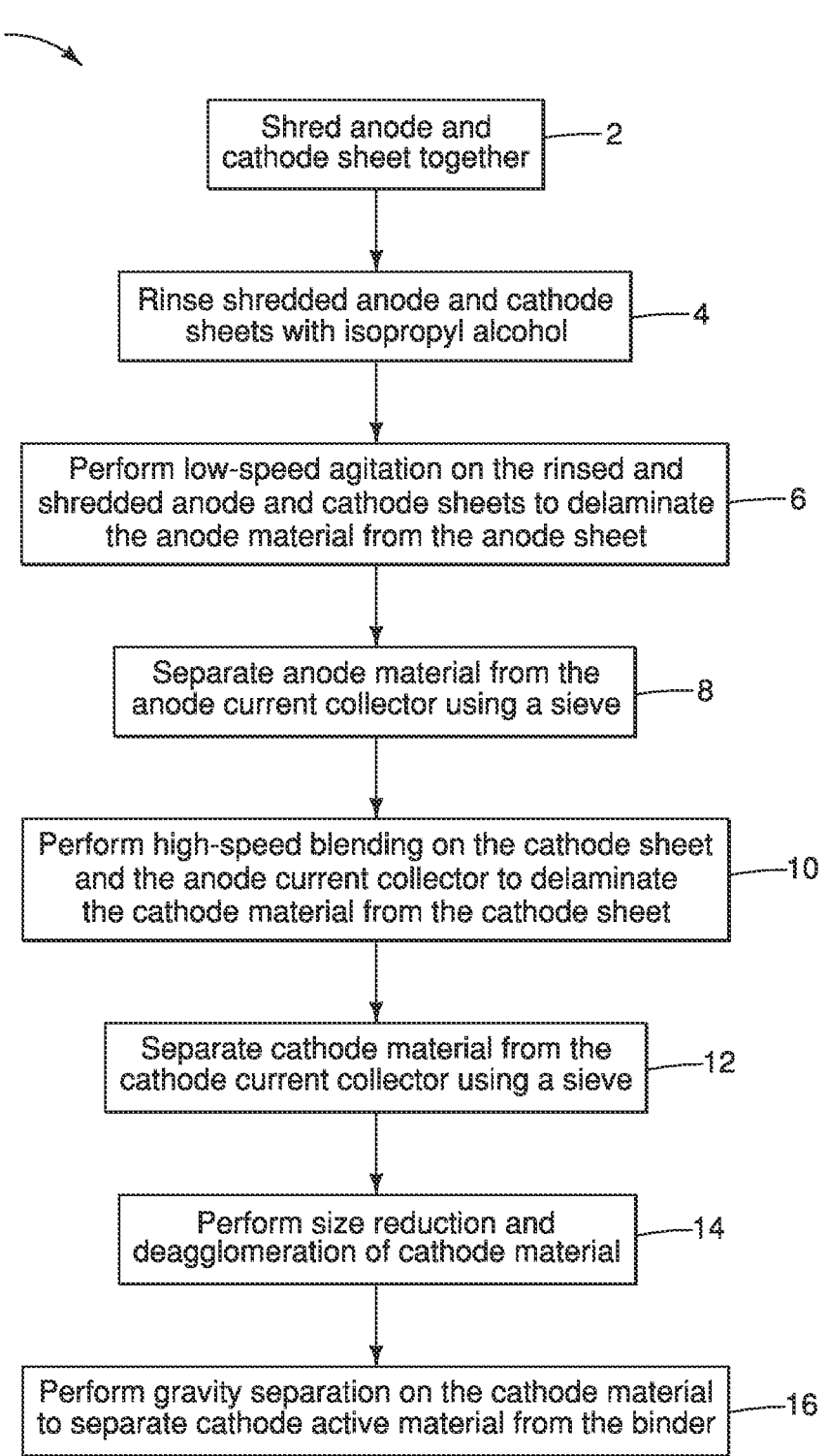
FIG. 1 is an illustrated flow chart showing a process of producing a cathode active material according to a first embodiment.

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Referring initially to FIG. 1, a process 1 of producing a cathode active material from a used lithium-ion battery is illustrated in accordance with a first embodiment. The lithium-ion battery includes a cathode sheet, an anode sheet and an electrolyte. The lithium-ion battery may be any suitable lithium-ion battery and can be a battery that was used in a vehicle, a mobile device, a laptop computer or other suitable personal electronic device. The anode sheet and the cathode sheet may be removed from the used lithium-ion battery in any suitable manner.

In Step 2, the anode sheet and the cathode sheet are shredded together. The cathode and anode sheets may be shredded in any suitable manner, for example using a blade or by cutting the sheets. For example, The anode sheet includes an anode material disposed on an anode current collector. The anode current collector is formed of any suitable metal material, such as aluminum or copper, preferably copper. The anode current collector has a thickness ranging from 60 μm to 100 μm, preferably 60 μm. The anode material is formed of any suitable anode material for a lithium-ion battery. The anode material is preferably formed of a carbon material such as graphite. The anode material preferably has a thickness ranging from 50 μm to 70 μm.

The cathode sheet includes a cathode material disposed on a cathode current collector. The cathode current collector is formed of any suitable metal material, such as aluminum or copper, preferably aluminum. The cathode current collector has a thickness ranging from 60 μm to 100 μm, preferably 60 μm. The cathode material includes any suitable cathode active material that is compatible with an electrolyte for a lithium-ion battery. For example, the cathode active material may be formed of a lithium transition metal oxide such as NMC or lithium cobalt oxide, lithium phosphate, lithium iron phosphate or a mixture thereof. The cathode active material is preferably formed of NMC. The cathode active material may be in the form of particles having a diameter of approximately 15 nm to 20 μm.

The cathode material also includes a binder. The binder may be any suitable electrode binder material. For example, the binder may include polyvinylidene fluoride ("PVDF"), polytetrafluoroethylene, styrene-butadiene rubber, a cellulose material or any combination thereof. The binder is preferably formed of PVDF. The cathode material includes approximately 90-95 percent by weight of the cathode active material and five to ten percent by weight of the binder.

In Step 4, the shredded anode and cathode sheets are rinsed with IPA. The anode and cathode sheets may be rinsed with any suitable amount of IPA sufficient to clean any debris from the sheets. For example, the anode and cathode sheets may be rinsed with approximately 0.5-1 ml of IPA per g of the anode and cathode sheets. It should also be understood that any suitable organic solvent may be used instead of IPA. For example, the anode and cathode sheets may be rinsed with ethanol, acetone or a mixture thereof.

In Step 6, after the shredded anode and cathode sheets have been rinsed with IPA, the anode and cathode sheets are agitated at a low speed to selectively delaminate the anode material from the anode sheet. The low-speed agitation may be performed at a speed of approximately 800 rpm to 1,000 rpm for approximately 1 minute to 5 minutes, preferably 2 minutes. The low-speed agitation may be performed in any suitable device. For example, the low-speed agitation device may include a blade having substantially flat edges for delaminating the anode material from the anode current collector of the anode sheet.

In Step 8, after the anode material has been delaminated from the anode current collector of the anode sheet, the anode material is separated from the anode current collector using a sieve and/or a filter, preferably a sieve, having a size sufficient to separate the anode material from the anode current collector. For example, the sieve has a size of approximately 1.7 mm or less. The anode material is recovered as undersize from the sieve, and both the anode current collector and the cathode sheet are collected as oversize from the sieve.

In Step 10, the cathode sheet and the anode current collector are blended at a high speed to selectively delaminate the cathode material from the cathode sheet. The high-speed blending may be performed at a speed of approximately 16,000 rpm to 18,000 rpm for approximately 1 minute to 5 minutes, preferably 2 minutes. The high-speed blending may be performed in any suitable device. For example, the high-speed blending device may include a blade having substantially flat edges for delaminating the cathode material from the cathode current collector of the cathode sheet.

In Step 12, after the cathode material has been delaminated from the cathode current collector, the cathode material is separated from the cathode current collector and the anode current collector using a sieve and/or a filter, preferably a sieve, having a size sufficient to separate the cathode material from the anode and cathode current collectors. For example, the sieve has a size of approximately 45 μm or less. The cathode material is recovered from the sieve.

In Step 14, after the cathode material has been separated from the anode and cathode current collectors, deagglomeration and size reduction is performed on the cathode material. The deagglomeration and size reduction may be performed in any suitable device. For example, the device may include a blade having substantially sharp edges. Deagglomeration and size reduction is performed at a speed of approximately 18,000 rpm to 20,000 rpm for approximately 1 minute to 3 minutes.

In this embodiment, the deagglomeration and size reduction is performed by sending the cathode material to the deagglomeration and size reduction device after it has been separated from the cathode current collector and the anode current collector. However, it should be understood that the cathode material may alternatively be separated from the anode and cathode current collectors after deagglomeration and size reduction is performed. i.e., Step 14 may be performed before Step 12.

In Step 16, gravity separation is performed on the cathode material recovered from the sieve to separate the cathode active material from the binder. The gravity separation may be performed in any suitable device, preferably in a plurality of devices. For example, the gravity separation may be performed by mixing the cathode material with water in a first gravity separation device and separating the resulting mixture into a lighter first top stream and a heavier first bottoms stream. The first top stream contains water and binder, and the first bottoms stream contains the cathode active material. The first bottoms stream may then be sent to a second gravity separation device. In the second gravity separation device, the first bottoms stream is mixed with water, and the resulting mixture is separated into a lighter second top stream and a heavier second bottoms stream. The second bottoms stream is recovered as the high purity cathode active material, or the second bottoms stream is optionally sent to a third gravity separation device for further removal of binder to increase the punty of the recovered cathode active material.

FIG. 2 shows a system 20 for producing a cathode active material from an anode sheet and a cathode sheet of a used lithium-ion battery in accordance with a second embodiment. The lithium-ion battery includes the cathode sheet, the anode sheet and an electrolyte. The lithium-ion battery may be any suitable lithium-ion battery and can be a battery that was used in a vehicle, a mobile device, a laptop computer or other suitable personal electronic device. The anode sheet and the cathode sheet are removed from the used lithium-ion battery in any suitable manner.

The system 20 includes an inlet 21 for introducing the anode sheet and the cathode sheet into a shredding device 22. The anode sheet includes an anode material disposed on an anode current collector. The anode current collector is formed of any suitable metal material, such as aluminum or copper, preferably copper. The anode current collector has a thickness ranging from 60 μm to 100 μm, preferably 60 μm. The anode material is formed of any suitable anode material for a lithium-ion battery. The anode material is preferably formed of a carbon material such as graphite. The anode material preferably has a thickness ranging from 50 μm to 70 μm.

The cathode sheet includes a cathode material disposed on a cathode current collector. The cathode current collector is formed of any suitable metal material, such as aluminum or copper, preferably aluminum. The cathode current collector has a thickness ranging from 60 μm to 100 μm, preferably 60 μm. The cathode material includes any suitable cathode active material that is compatible with an electrolyte for a lithium-ion battery. For example, the cathode active material may be formed of a lithium transition metal oxide such as NMC or lithium cobalt oxide, lithium phosphate, lithium iron phosphate or a mixture thereof. The cathode active material is preferably formed of NMC. The cathode active material may be in the form of particles having a diameter of approximately 15 nm to 20 μm.

The cathode material also includes a binder. The binder may be any suitable electrode binder material. For example, the binder may include polyvinylidene fluoride ("PVDF"), polytetrafluoroethylene, styrene-butadiene rubber, a cellulose material or any combination thereof. The binder is preferably formed of PVDF. The cathode material includes approximately 90-95 percent by weight of the cathode active material and five to ten percent by weight of the binder.

The shredding device 22 is configured to rinse the anode sheet and the cathode sheet with an organic solvent and shred the sheets with a blade 22a. As shown in FIG. 2, the blade 22a has substantially sharp edges. The shredding device 22 is configured to rinse the anode and cathode sheets with any suitable organic solvent, such as IPA, ethanol, acetone or a mixture thereof, preferably IPA. The anode and cathode sheets may be rinsed with an amount of organic solvent sufficient to clean any debris from the sheets. For example, the shredding device 22 is configured to rinse the anode and cathode sheets with approximately 0.5-1 ml of organic solvent per g of the anode and cathode sheets.

The system 20 also includes an outlet 23 from the shredding device 22. The outlet 23 is configured to feed the rinsed and shredded anode and cathode sheets to a low-speed agitation device 24. The low-speed agitation device 24 is configured to agitate the anode and cathode sheets at a low speed of approximately 800 rpm to 1,000 rpm for approximately 1 minute to 5 minutes, preferably 2 minutes, to selectively delaminate the anode material from the anode sheet. The low-speed agitation device includes a blade 24a having substantially flat edges for delaminating the anode material from the anode current collector of the anode sheet. The blade 24a may be formed by grinding a conventional blade to make the edges of the blade flat.

The system 20 includes an outlet 25 from the low-speed agitation device 24. The outlet 25 is configured to feed the cathode sheet, the anode current collector and the anode material that has been selectively delaminated from the anode current collector to a sieve 26 for separating the anode material from the anode current collector and the cathode sheet. The sieve 26 has a size sufficient to separate the anode material from the anode current collector. For example, the sieve has a size of approximately 1.7 mm or less. The anode material may be recovered from the sieve through outlet 27.

The system 20 also includes an inlet 29 that is configured to feed the anode current collector and the cathode sheet to a high-speed blending device 30. The high-speed blending device 30 is configured to blend the cathode sheet and the anode current collector at a high speed of approximately 16,000 rpm to 18,000 rpm for approximately 1 minute to 5 minutes, preferably 2 minutes, to selectively delaminate the cathode material from the cathode sheet. The high-speed blending device 30 includes a blade 30a having substantially flat edges for delaminating the cathode material from the cathode current collector of the cathode sheet. As with blade 24a, the blade 30a may be formed by grinding a conventional blade to make the edges of the blade flat.

The system 20 also includes an outlet 31 from the high-speed blending device 30. The outlet 31 is configured to feed the anode current collector, the cathode current collector and the cathode material that has been selectively delaminated to a sieve 32. The sieve 32 has a size sufficient to separate the cathode material from the anode and cathode current collectors. For example, the sieve 32 has a size of approximately 45 μm or less. The cathode material is recovered from the sieve 32 through outlet 33. The sieve 32 also includes an outlet 35 configured to recover the anode and cathode current collectors.

The outlet 33 from the sieve 32 is configured to feed the cathode material recovered from the sieve 32 to a deagglomeration device 36 after the cathode material has been separated from the cathode current collector. The deagglomeration device 36 is configured to perform deagglomeration and size reduction at a speed of approximately 18.000 rpm to 20,000 rpm for approximately 1 minute to 2 minutes. The deagglomeration device 36 includes a blade 36a having substantially sharp edges and an outlet 37.

In this embodiment, the deagglomeration device 36 is located downstream of the sieve 32 such that deagglomeration and size reduction is performed after separating the cathode material from the cathode current collector. However, it should be understood that the deagglomeration device 36 may alternatively be located upstream of the sieve 32 such that the cathode material is separated from the anode and cathode current collectors after deagglomeration and size reduction is performed.

The outlet 37 is connected to a first gravity separation device 38. The first gravity separation device 38 is configured to separate the cathode active material from the binder of the cathode material. For example, the first gravity separation device 38 is configured to mix the cathode material with water using a mixer 38a and separate the resulting mixture using gravity into a heavier first bottoms stream in outlet 39 and a lighter first top stream in outlet 40. The first bottoms stream in outlet 39 contains the cathode active material and some amount of binder, and the first top stream in outlet 40 contains water and binder.

The outlet 39 containing the first bottoms stream is configured to be fed to a second gravity separation device 42. The second gravity separation device 42 is configured to separate the cathode active material from binder remaining in the first bottoms stream. For example, the second gravity separation device 42 is configured to mix the material from outlet 39 with water using a mixer 42a and separate the resulting mixture using gravity into a heavier second bottoms stream in outlet 43 and a lighter second top stream in outlet 45. The second bottoms stream in outlet 43 contains cathode active material having a higher purity than the cathode active material in outlet 39, and the second top stream in outlet 45 contains water and binder.

The outlet 43 containing the second bottoms stream is configured to be fed to a third gravity separation device 46. The third gravity separation device 46 is configured to separate the cathode active material from binder remaining in the second bottoms stream. For example, the third gravity separation device 46 is configured to mix the material from outlet 43 with water using a mixer 46a and separate the resulting mixture using gravity into a heavier third bottoms stream in outlet 47 and a lighter third top stream in outlet 49. The third bottoms stream in outlet 47 contains cathode active material having a higher purity than the material in outlet 43, and the third top stream in outlet 49 contains water and binder.

The first, second and third top streams in outlets 40, 45 and 49 are all combined to form a light tails stream that exits the system through outlet 50. The third bottoms stream in outlet 47 is recovered as the high purity cathode active material from system 20.

FIG. 3 illustrates a process 60 of producing a cathode active material from a used lithium-ion battery in accordance with a third embodiment. The process 60 is a gravity separation process for separating a cathode active material from a binder in a cathode material. The used lithium-ion battery includes a cathode sheet, an anode sheet and an electrolyte. The lithium-ion battery may be any suitable lithium-ion battery and can be a battery that was used in a vehicle, a mobile device, a laptop computer or other suitable personal electronic device. Before the process 60, the anode sheet and the cathode sheet are removed from the used lithium-ion battery and processed to obtain the cathode material.

In Step 62, the cathode material obtained from the used lithium-ion battery is mixed with water. The cathode material includes any suitable cathode active material that is compatible with an electrolyte for a lithium-ion battery. For example, the cathode active material may be formed of a lithium transition metal oxide such as NMC or lithium cobalt oxide, lithium phosphate, lithium iron phosphate or a mixture thereof. The cathode active material is preferably formed of NMC. The cathode active material may be in the form of particles having a diameter of approximately 15 nm to 20 μm.

The cathode material also includes the binder. The binder may be any suitable electrode binder material. For example, the binder may include PVDF, polytetrafluoroethylene, styrene-butadiene rubber, a cellulose material or any combination thereof. The binder is preferably formed of PVDF. The cathode material includes approximately 90-95 percent by weight of the cathode active material and five to ten percent by weight of the binder.

The amount of water mixed with the cathode material may be any suitable amount of water for gravity separation of a cathode active material and a binder. For example, the cathode material may be mixed with approximately 10-20 ml of water per g of the cathode material.

In Step 64, the mixture of water and the cathode material is fed to a rougher. The rougher may be any suitable device for mixing the cathode material with the water and performing gravity separation of the mixture.

In Step 66, the mixture of water and the cathode material is separated into a lighter top stream and a heavier bottoms stream using gravity. For example, the mixture of water and the cathode material is separated into a lighter stream that contains water and binder and a first cathode active material stream that contains the cathode active material and some amount of binder.

In Step 68, the first cathode active material stream is fed to a first cleaner, water is added to the first cathode active material stream, and the mixture of water and the first cathode active material stream is separated into a lighter top stream and a heavier bottoms stream using gravity. For example, the mixture of water and the first cathode active material stream is separated into a lighter stream that contains water and binder and a second cathode active material stream that contains the cathode active material and some amount of binder. The cathode active material in the second cathode active material stream has a higher purity than the cathode active material in the first cathode active material stream.

In Step 70, the second cathode active material stream is fed to a second cleaner, water is added to the second cathode active material stream, and the mixture of water and the second cathode active material stream is separated into a lighter top stream and a heavier bottoms stream using gravity. For example, the mixture of water and the second cathode active material stream is separated into a lighter stream that contains water and binder and a cathode active material stream that contains the cathode active material and some amount of binder. The cathode active material in the cathode active material stream has a higher purity than the cathode active material in the second cathode active material stream. The cathode active material stream is recovered as the high purity cathode active material, or the cathode active material stream is optionally sent to another gravity separation device for further removal of binder to increase the purity of the recovered cathode active material.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms. "including." "having" and their derivatives. Also, the terms "part," "section," "portion," or "element" when used in the singular can have the dual meaning of a single part or a plurality of parts.

The terms of degree, such as "approximately" or "substantially" as used herein, mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:
1. A method of producing a cathode active material, the method comprising:

shredding an anode sheet comprising an anode material disposed on an anode current collector with a cathode sheet comprising a cathode material disposed on a cathode current collector;

rinsing the anode sheet and the cathode sheet with an organic solvent;

agitating the anode sheet and the cathode sheet at a first speed to delaminate the anode material from the anode current collector;

separating the anode material from the anode current collector using at least one of a first filter and a first sieve;

blending the anode current collector and the cathode sheet at a second speed to delaminate the cathode material from the cathode current collector;

performing size reduction and deagglomeration on the cathode material, the cathode material comprising the cathode active material and a binder;

separating the cathode material from the cathode current collector using at least one of a second filter and a second sieve; and performing gravity separation on the cathode material to separate the cathode active material from the binder.

2. The method according to claim 1, wherein the binder comprises polyvinylidene fluoride.

3. The method according to claim 1, wherein the cathode active material comprises a lithium transition metal oxide.

4. The method according to claim 3, wherein the lithium transition metal oxide is $LiNiMnCoO_2$.

5. The method according to claim 1, wherein the first speed is less than the second speed.

6. The method according to claim 1, wherein the first speed is greater than or equal to 800 rpm and less than or equal to 1,000 rpm.

7. The method according to claim 1, wherein the second speed is greater than or equal to 16,000 rpm and less than or equal to 18,000 rpm.

8. The method according to claim 1, wherein the organic solvent is isopropyl alcohol.

9. The method according to claim 1, wherein the anode material comprises graphite.

10. The method according to claim 1, wherein the gravity separation comprises a plurality of gravity separation steps.

11. The method according to claim 1, wherein the second filter and the second sieve each have a size of 45 μm or less.

12. A method of separating a binder from a cathode active material, the method comprising:

combining the binder, the cathode active material and water in a first vessel to form a first mixture and using gravity to separate the first mixture into a first top stream comprising the water and the binder and a first bottom stream comprising the cathode active material;

feeding the first bottom stream into a second vessel, adding water to the second vessel to form a second mixture, and using gravity to separate the second mixture into a second top stream comprising the water and the binder and a second bottom stream comprising the cathode active material.

13. The method according to claim 12, wherein the binder comprises polyvinylidene fluoride.

14. The method according to claim 12, wherein the cathode active material comprises a lithium transition metal oxide.

15. The method according to claim 14, wherein the lithium transition metal oxide is $LiNiMnCoO_2$.

16. A system for producing a cathode active material from a cathode sheet and an anode sheet of a used battery, the cathode sheet comprising a cathode material disposed on a cathode current collector and the anode sheet comprising an anode material disposed on an anode current collector, the system comprising:

a first vessel configured to agitate the cathode sheet and the anode sheet at a first speed to delaminate the anode material from the anode current collector;

at least one of a first filter and a first sieve each having a size of 1.7 mm or less;

a second vessel configured to blend the anode current collector and the cathode sheet at a second speed to delaminate the cathode material from the cathode current collector;

a third vessel configured to perform size reduction and deagglomeration on the cathode material using a blade, the cathode material comprising the cathode active material and a binder;

at least one of a second filter and a second sieve each having a size of 45 μm or less; and at least one gravity separation vessel configured to separate the cathode active material from the binder.

17. The system according to claim 16, wherein the first speed is less than the second speed.

18. The system according to claim 16, wherein the first speed is greater than or equal to 800 rpm and less than or equal to 1,000 rpm.

19. The system according to claim 16, wherein the second speed is greater than or equal to 16,000 rpm and less than or equal to 18,000 rpm.

20. The system according to claim 16, wherein the second vessel comprises a blade having substantially flat edges.

* * * * *